US011583963B2

(12) United States Patent
Matsumoto et al.

(10) Patent No.: US 11,583,963 B2
(45) Date of Patent: Feb. 21, 2023

(54) PROCESSING DEVICE AND PROCESSING SYSTEM

(71) Applicant: HIRATA CORPORATION, Kumamoto (JP)

(72) Inventors: Bungo Matsumoto, Kumamoto (JP); Yoshiro Tomita, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 459 days.

(21) Appl. No.: 16/332,440

(22) PCT Filed: Sep. 6, 2017

(86) PCT No.: PCT/JP2017/032075
§ 371 (c)(1),
(2) Date: Mar. 12, 2019

(87) PCT Pub. No.: WO2018/216237
PCT Pub. Date: Nov. 29, 2018

(65) Prior Publication Data
US 2021/0283732 A1    Sep. 16, 2021

(51) Int. Cl.
*B23P 19/00* (2006.01)
*B23P 21/00* (2006.01)
(Continued)

(52) U.S. Cl.
CPC ........... *B23P 19/008* (2013.01); *B23P 19/007* (2013.01); *B23P 19/06* (2013.01); *B23P 21/00* (2013.01);
(Continued)

(58) Field of Classification Search
CPC .... B23Q 11/08; B23Q 37/007; B23Q 7/1405; B23Q 1/0045; Y10T 29/5196; B23P 21/004
See application file for complete search history.

(56) References Cited

U.S. PATENT DOCUMENTS 4,700,517 A * 10/1987 Stohr .................. F16P 1/02
52/471
4,836,111 A * 6/1989 Kaufmann ............... B23Q 1/26
104/247
(Continued)

FOREIGN PATENT DOCUMENTS

CN    101965245 A    2/2011
CN    102072744 A    5/2011
(Continued)

OTHER PUBLICATIONS

DE-102015001260-A1 machine translation (Year: 2016).*
(Continued)

*Primary Examiner* — Michael W Hotchkiss
(74) *Attorney, Agent, or Firm* — Buchanan Ingersoll & Rooney PC

(57) ABSTRACT

A processing device of the invention includes a partition member partitioning a processing space and an external space, a frame body on which the partition member is mounted, a positioning unit for holding a workpiece at a predetermined position in the processing space, a processing unit for applying a predetermined process using a processing tool on the workpiece, an opening/closing member capable of opening/closing a first opening formed in the partition member, and an instrument attachment member to which a control instrument is attached, wherein the partition member has a plurality of uniform mounting sections on which the opening/closing member and the instrument attachment member are mutually selectively mounted.

20 Claims, 4 Drawing Sheets

(51) Int. Cl.
  *B23P 19/06* (2006.01)
  *B23Q 11/08* (2006.01)
  *B23Q 1/01* (2006.01)
(52) U.S. Cl.
  CPC .......... *B23Q 11/08* (2013.01); *B23Q 11/0891* (2013.01); *B23Q 1/015* (2013.01)

(56) References Cited

U.S. PATENT DOCUMENTS

| | | | | |
|---|---|---|---|---|
| 5,698,959 | A * | 12/1997 | Yanagisawa | B25J 5/04 74/89.11 |
| 5,897,430 | A * | 4/1999 | Haller | B24B 5/04 451/451 |
| 6,364,582 | B1 * | 4/2002 | Hoppe | B23Q 11/0891 409/134 |
| 6,405,483 | B1 | 6/2002 | Tamada et al. | |
| 6,513,231 | B1 * | 2/2003 | Hafenrichter | B23Q 1/25 29/721 |
| 6,738,691 | B1 * | 5/2004 | Colgate | B25J 9/1689 318/632 |
| 7,159,294 | B2 * | 1/2007 | Yamazaki | B23K 26/361 29/564 |
| 7,325,667 | B1 * | 2/2008 | Damick | B65G 59/02 198/395 |
| 7,357,769 | B2 * | 4/2008 | Takayama | B23Q 1/5406 483/41 |
| 7,490,710 | B1 * | 2/2009 | Weskamp | B23Q 7/1426 29/33 P |
| 8,229,586 | B2 * | 7/2012 | Wallace | G05B 19/41805 700/114 |
| 8,317,453 | B2 * | 11/2012 | Givens | B25J 5/04 414/719 |
| 8,360,225 | B2 * | 1/2013 | Spangler | B65G 35/066 198/345.3 |
| 8,973,768 | B1 * | 3/2015 | Jung | B25J 9/026 414/626 |
| 9,027,231 | B2 * | 5/2015 | Mimura | B25J 21/00 29/721 |
| 9,033,532 | B2 | 5/2015 | Kitamura | |
| 9,114,474 | B2 * | 8/2015 | Osicki | B23K 37/006 |
| 9,529,354 | B2 * | 12/2016 | Igarashi | B23Q 11/0891 |
| 9,539,688 | B2 * | 1/2017 | Suzuki | B23Q 1/66 |
| 9,656,363 | B2 * | 5/2017 | Nishida | B23Q 1/5406 |
| 9,815,155 | B2 * | 11/2017 | Lin | B25J 5/007 |
| 10,024,483 | B2 * | 7/2018 | Leonhard | B23Q 11/0891 |
| 10,131,388 | B2 * | 11/2018 | Kilibarda | B23K 11/115 |
| 10,444,129 | B2 * | 10/2019 | Brown | G01N 3/04 |
| 10,518,360 | B2 * | 12/2019 | Brown | B23K 26/706 |
| 10,676,292 | B2 * | 6/2020 | Saylor | B65B 35/22 |
| 10,722,980 | B2 | 7/2020 | Tanaka et al. | |
| 10,782,676 | B2 * | 9/2020 | Besik | B23K 37/0461 |
| 10,815,074 | B2 * | 10/2020 | Yamaoka | B65B 43/52 |
| 10,960,506 | B2 * | 3/2021 | Takada | B23Q 11/0891 |
| 11,059,135 | B1 * | 7/2021 | Bruzzone | F16H 25/2409 |
| 2004/0081525 | A1 * | 4/2004 | Oguma | B23Q 1/0054 409/134 |
| 2007/0042882 | A1 * | 2/2007 | Konvicka | B23Q 11/0816 409/134 |
| 2007/0235433 | A1 * | 10/2007 | Osicki | B23K 37/0461 219/125.1 |
| 2008/0168860 | A1 * | 7/2008 | Nishi | B23Q 11/0891 409/134 |
| 2009/0099680 | A1 * | 4/2009 | Usui | B23Q 7/04 901/41 |
| 2009/0118858 | A1 * | 5/2009 | Wallace | B23P 19/001 700/110 |
| 2009/0120920 | A1 * | 5/2009 | Gurney | B25J 21/00 219/136 |
| 2010/0310349 | A1 * | 12/2010 | Bonhomme | B65G 59/00 414/788.1 |
| 2011/0004340 | A1 | 1/2011 | Osada et al. | |
| 2011/0258847 | A1 * | 10/2011 | Meisho | B25J 21/00 29/700 |
| 2012/0213625 | A1 * | 8/2012 | Roberts | B65G 57/03 414/788.1 |
| 2012/0255939 | A1 * | 10/2012 | Osicki | B23K 37/047 219/136 |
| 2015/0174718 | A1 * | 6/2015 | Preis | B23P 21/004 29/563 |
| 2015/0252604 | A1 * | 9/2015 | Inaguchi | E05D 15/0656 49/409 |
| 2017/0087682 | A1 | 3/2017 | Leonhard et al. | |
| 2017/0266772 | A1 * | 9/2017 | Asakawa | B23Q 3/15526 |
| 2018/0250780 | A1 * | 9/2018 | Scholtz | B23Q 7/03 |
| 2018/0361522 | A1 * | 12/2018 | Fornasero | B23Q 11/0891 |
| 2019/0106283 | A1 * | 4/2019 | Yamaoka | B65G 47/907 |

FOREIGN PATENT DOCUMENTS

| | | | | |
|---|---|---|---|---|
| CN | 104117857 A | | 10/2014 | |
| CN | 105171514 A | | 12/2015 | |
| DE | 202011001493 U1 | * | 5/2011 | ............ B23Q 1/015 |
| DE | 102015001260 A1 | * | 4/2016 | ............ B23P 19/04 |
| EP | 0808691 A2 | | 11/1997 | |
| JP | 02122745 U | | 10/1990 | |
| JP | 05016052 A | | 1/1993 | |
| JP | 06126585 A | | 5/1994 | |
| JP | 2000094260 A | | 4/2000 | |
| JP | 2005517842 A | | 6/2005 | |
| JP | 2007223002 A | | 9/2007 | |
| JP | 3136412 U | | 10/2007 | |
| JP | 2017064744 A | | 4/2017 | |
| WO | 03071050 A1 | | 8/2003 | |
| WO | 2008026278 A1 | | 3/2008 | |

OTHER PUBLICATIONS

DE-202011001493-U1 machine translation (Year: 2011).*
Office Action/Search Report dated May 29, 2020, by the Chinese Patent Office in corresponding Chinese Patent Application No. 201780051894.9 and English translation of the Office Action/Search Report. (23 pages).
Extended European Search Report dated Mar. 23, 2020, issued by the European Patent Office in corresponding European Application No. 17910900.4. (8 pages).
International Search Report (PCT/ISA/210) dated Nov. 21, 2017, by the Japanese Patent Office as the International Searching Authority for International Application No. PCT/JP2017/032075.
Written Opinion (PCT/ISA/237) dated Nov. 21, 2017, by the Japanese Patent Office as the International Searching Authority for International Application No. PCT/JP2017/032075.
Korean Office Action dated Nov. 20, 2020 issued by the Korean Patent Office in Korean Patent Application No. 10-2019-7005132, with English translation (16 pages).

* cited by examiner

PROCESSING DEVICE AND PROCESSING SYSTEM

TECHNICAL FIELD

The present invention relates to a processing device for applying a predetermined process on a workpiece, and a processing system having a plurality of the processing devices, the system applies a plurality of kinds of process on the workpiece continuously.

BACKGROUND ART

In such a processing system, a plurality of processing devices are installed in a factory, a workpiece is sequentially transferred to the respective processing devices by a transfer device, and predetermined process is performed on the transferred workpiece in the processing devices. The predetermined process performed in the processing devices is automatically performed in accordance with a program.

Patent Document 1 discloses a workpiece automatic processing system including a plurality of workpiece automatic processing devices that define a plurality of work stations, and a conveying device that conveys a workpiece through the plurality of workpiece automatic processing devices. Each workpiece automatic processing device has a pair of fixed frames, a pair of movable frames, a pair of work heads, and control means. In the workpiece automatic processing system of Patent Document 1, as the components of the respective workpiece automatic processing devices are made common to each other, the overall system is simplified and a control sequence is simplified (standardized).

Patent Document 2 discloses a processing device in which a robot for performing work on a first workpiece and a second workpiece is surrounded by a protective fence. A second workpiece moving mechanism, which puts the second workpiece thereon and moves the second workpiece from the outside of the protective fence to an operating range of the robot, is attached to the protective fence. In the processing device of Patent Document 2, since the second workpiece moving mechanism is provided, a person does not need to enter the protective fence when the robot is made to perform work on the second workpiece. Accordingly, a sensor or a switch for detecting the person can be omitted, and the configuration of the processing device can be simplified.

In a factory in which the processing device is installed, structures, such as columns or walls, passages through which an operator passes, or the like become hindrances when installing the processing device, or existing objects that may degrade the workability in the factory as a result of the installation of the processing device are present. Such existing objects are disposed in a state where it cannot be said that the existing objects are necessarily regular in the factory, and the arrangement thereof also varies depending on factories. Particularly in a factory where long years have passed from the construction thereof, layout changes or reconstruction in the factory is performed. In order to install the processing device, it is actually necessary to check the installation location of the processing device in the factory. Additionally, in a case where the processing device is installed in a newly built factory, the installation location thereof is assumed from a drawing on the inside of the factory from before the completion of the factory, the processing device is designed and made in parallel with the construction of the factory, and the processing device is installed in the factory that has actually been completed. However, the installation location of the processing device in the completed factory may be different from that of the drawing.

In the workpiece automatic processing system disclosed in Patent Document 1, since the components of the respective workpiece automatic processing devices are made common to each other, respective parts of the workpiece automatic processing system are regularly arranged. However, since the existing objects in the factory are irregularly disposed, there are cases where the respective parts of the workpiece automatic processing system may interfere with the existing objects in their original forms and may not be able to achieve their original functions. In that case, it is necessary to partially change the shapes or structures of the respective parts of the workpiece automatic processing system so as not to interfere with the existing objects.

Even in the processing device disclosed in Patent Document 2, there is a case where the safe fence (protective fence) may not be able to be appropriately disposed because the existing objects in the factory interfere with a safety fence. For that reason, it is necessary to partially change the shape or arrangement of the safe fence so as not to interfere with obstacles.

Adding such partial changes may become the cause of increasing the cost required for the installation of the processing system into the factory and extending the installation time of the processing system.

CITATION LIST

Patent Documents

Patent Document 1: PCT International Publication No. WO2008/026278
Patent Document 2: Japanese Unexamined Patent Application, First Publication No. 2007-223002

SUMMARY OF THE INVENTION

Technical Problem

The present invention has been made in view of the above circumstances, and an object thereof is to provide a processing device capable of freely changing a layout in accordance with surrounding environments, and a processing system constituted of a plurality of the processing devices.

Solution to Problem

A processing device of the invention includes: a partition member partitioning a processing space and an external space outside the processing space from each other; a frame body on which the partition member is mounted; a positioning unit supported by the frame body and configured to hold a workpiece at a predetermined position in the processing space; a processing unit supported by the frame body and configured to apply a predetermined process using a processing tool on the workpiece held by the positioning unit; an opening/closing member installed on the partition member and capable of opening/closing a first opening formed in the partition member; and an instrument attachment member installed on the partition member and to which a control instrument for controlling the positioning unit and the processing unit is attached, wherein the partition member has a plurality of uniform mounting sections on which the opening/closing member and the instrument attachment member are mutually selectively mounted.

Also, a processing system of the invention is for transferring a workpiece between a plurality of processing devices and applying a predetermined process on the workpiece in each processing device. The processing system includes: a plurality of the above mentioned processing devices; and a transfer device transferring the workpiece between the plurality of processing devices.

Advantageous Effects of Invention

According to the processing device and the processing system of the invention, a layout can be freely changed in accordance with surrounding environments.

DESCRIPTION OF EMBODIMENTS

A processing device 1 and a processing system 100 related to an embodiment of the invention will be described below.

Figure 1:
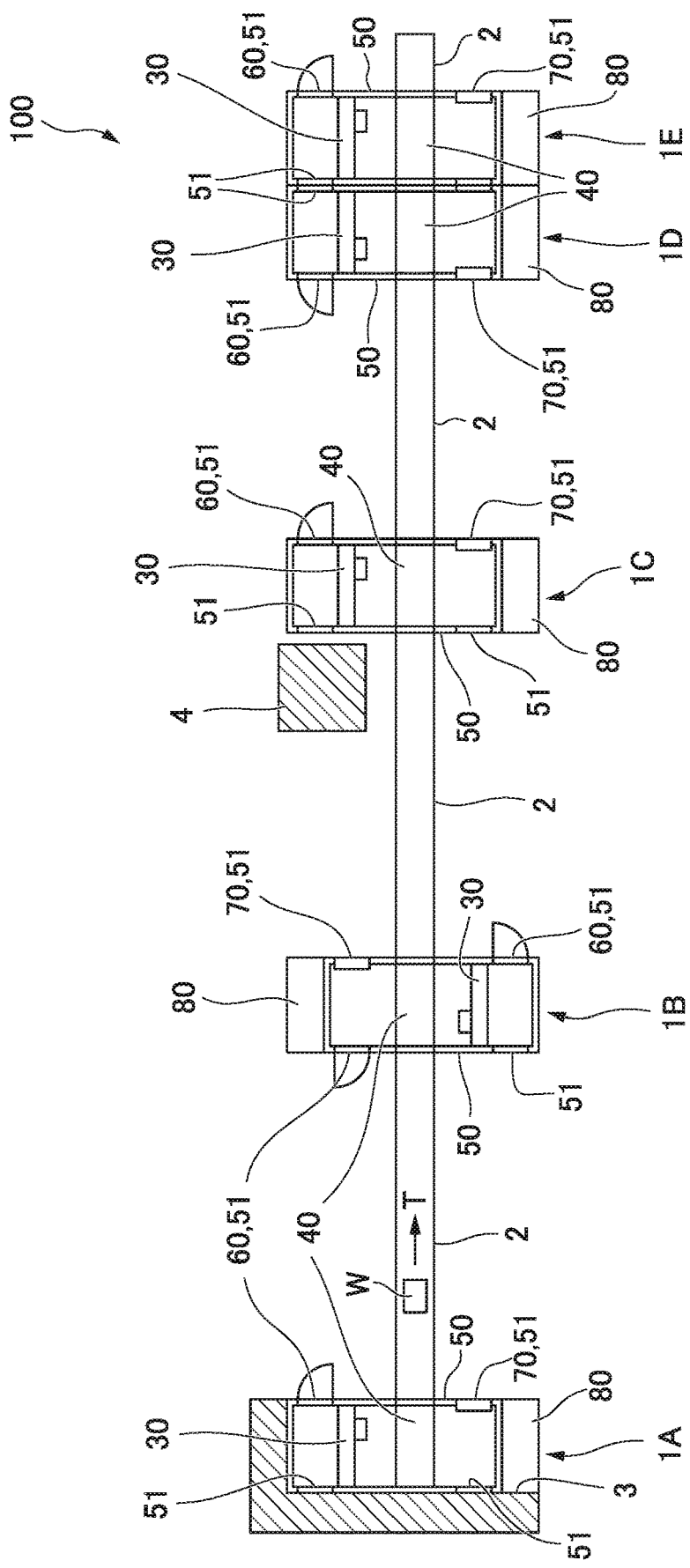
FIG. 1 is a schematic plan view of a processing system related to an embodiment of the invention.

FIG. 1 is a schematic plan view of the processing system 100 related to the present embodiment. The processing system 100 of the present embodiment is one that transfers a workpiece W between a plurality of the processing devices 1 (1A to 1E) and performs work on the workpiece W in each processing device 1, and includes the plurality of processing devices 1 (1A to 1E), and a transfer device 2 that transfers the workpiece W between the plurality of processing devices 1.

As illustrated in FIG. 1, the plurality of processing devices 1 are provided along a transfer path formed by the transfer device 2. Each processing device 1 is disposed apart from or adjacent to a processing device 1 on an upstream side or a downstream side in a transfer direction T of the workpiece W. The transfer device 2 is provided between the processing devices 1 juxtaposed apart from each other along the transfer path. The transfer path of the workpiece W of the processing system 100 is formed by transferring units 40 (to be described below) of the transfer device 2 and the processing devices 1.

(Processing Device)

Each processing device 1 of the present embodiment constituting the processing system 100 includes a partition member 50 that partitions a processing space S and an external space outside the processing space from each other; a frame body 10 on which the partition member 50 is mounted; a positioning unit 20 that is supported by the frame body 10 and holds the workpiece W at a predetermined position in the processing space S; a processing unit 30 that is supported by the frame body 10 and performs predetermined process using a processing tool 32 on the workpiece W held by the positioning unit 20; an opening/closing member 60 that is provided in the partition member 50 and capable of opening/closing a first opening 52 formed in the partition member 50; and an instrument attachment member 70 which is provided in the partition member 50 and to which a control instrument 71 for controlling an input instrument and an output instrument (not illustrated) to be used with the processing device 1 is attached. The partition member 50 has a plurality of uniform mounting sections 51 on which the opening/closing member 60 and the instrument attachment member 70 are mutually selectively mounted.

The processing device 1 of the present embodiment further includes a control device 80 that performs high-order control of all the instruments included in the processing device 1; a transferring unit 40 that enables transfer of the workpiece W between the processing space S and the external space; and a supply unit 90 that supplies another workpiece W (second workpiece W2) assembled to the workpiece W (first workpiece W1) transferred by the transferring unit 40.

(Frame Body)

Figure 2:
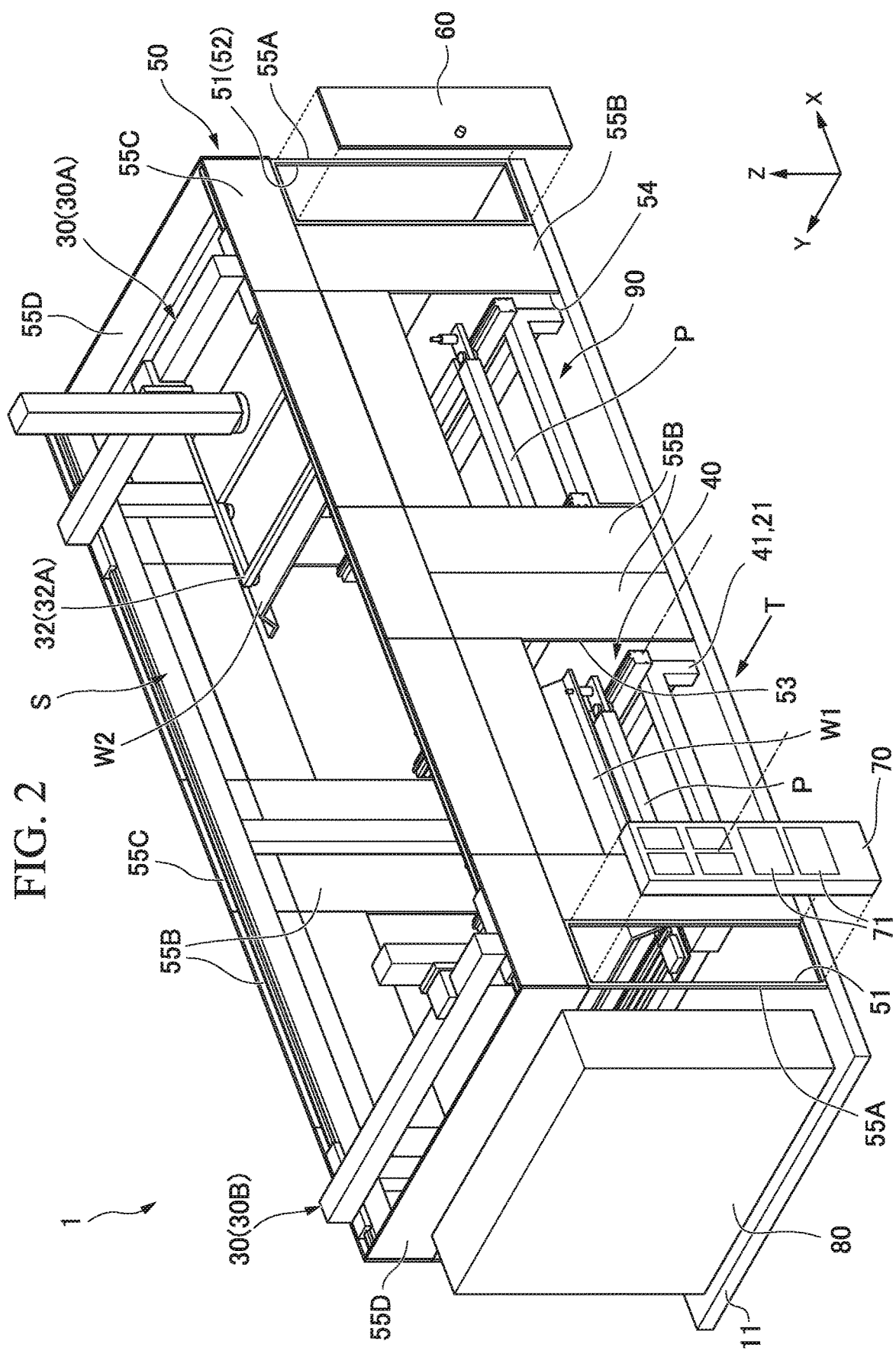
FIG. 2 is a perspective view of a processing device related to the embodiment of the invention.
Figure 3:
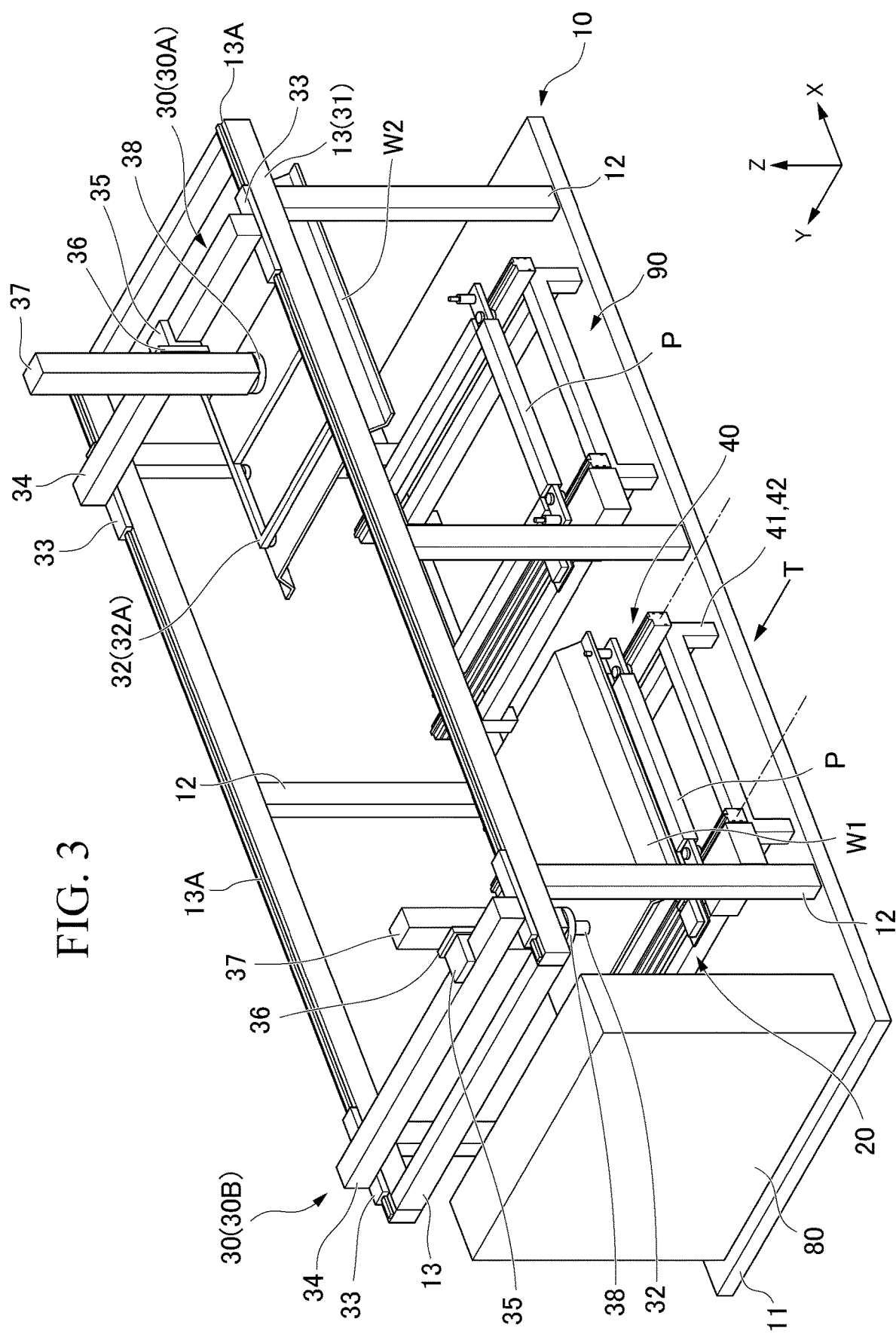
FIG. 3 is a processing device of FIG. 2 excluding a partition member.

FIG. 2 is a perspective view of the processing device 1 related to the embodiment of the invention, and FIG. 3 illustrates the processing device 1 of FIG. 2 excluding the partition member 50. As illustrated in FIGS. 2 and 3, the frame body 10 includes a base 11, a plurality of columns 12 supported by the base 11, and a plurality of beams 13 supported by the columns 12. In the present embodiment, the base 11 is constituted of a flat plate having a rectangular horizontal surface. The horizontal surface is an upper surface of the base 11, and is an installation surface on which constituent members of the processing device 1 are installed. In the present specifications, a longitudinal direction of the horizontal surface of the base 11 may be referred to as an X direction, a lateral direction may be referred to as a Y direction, and a direction (vertical direction) perpendicular to the horizontal surface (XY plane) of the base 11 may be referred to as a Z direction. An upper side (upper side in the vertical direction) in FIGS. 2 and 3 may be referred to as a Z-direction upper side, and a lower side may be referred to as a Z-direction lower side.

The plurality of columns 12 extending in the horizontal surface of the base 11 are disposed in the vertical direction. In the present embodiment, three columns 12 are disposed along each long side of the horizontal surface of the base 11, and a total of six columns 12 are provided on the horizontal surface. At upper ends of the columns 12, each of the pair of beams 13 extending in the X direction is supported by the three columns 12. Both ends of each of the pair of beams 13 extending in the X direction are connected via a pair of beams 13 extending in the Y direction to form a rectangular frame. Each beam 13 extending in the X direction is provided with an X-axis rail 13A.

Such a frame body 10 is provided with a partition member mounting section on which the partition member 50 is mounted. By mounting the partition member 50 on the partition member mounting section, the processing space S and the external space outside the processing space are partitioned. In the present embodiment, the base 11, the columns 12, and the beams 13 of the frame body 10 are equivalent to the partition member mounting section. In addition, the processing space S is a space where predetermined process is performed on the workpiece W and is a space surrounded by the partition member 50 in the X direction and the Y direction. In the following, in the X direction, a direction toward the inside of the processing space S is referred to as an X-direction inner side, and a direction toward the outside of the processing space S is referred to as an X-direction outer side. Additionally, in the Y direction, a direction toward the inside of the processing space S is referred to as a Y-direction inner side, and a direction toward the outside of the processing space S is referred to as a Y-direction outer side. Additionally, the expression "being surrounded by the partition member 50" includes being surrounded by the partition member 50 a portion of which is open, in addition to being surrounded without any gap by the partition member 50.

Additionally, the frame body 10 is provided with a positioning unit support part 21 and a processing unit support part. The positioning unit support part 21 supports the positioning unit 20 in the processing space S. In the present embodiment, the positioning unit support part 21 is disposed on the horizontal surface of the base 11 as will be described below, and the positioning unit support part 21 also serves as a transferring unit support part 41. The processing unit support part supports the processing unit 30 in the processing space S. In the present embodiment, as will be described below, the pair of beams 13 extending in the X direction is equivalent to a processing unit support part 31.

Moreover, the frame body 10 includes a control device support part. The control device support part supports the control device 80 outside (external space) the processing space S. In the present embodiment, a region (left sides of FIGS. 2 and 3), on the X-direction outer side with respect to one beam 13 extending in the Y direction, in the horizontal surface of the base 11 is equivalent to the control device support part. Additionally, the frame body 10 is provided with the transferring unit support part 41. The transferring unit support part 41 supports the transferring unit 40. In the present embodiment, the transferring unit support part 41 is disposed on the horizontal surface of the base 11 in the processing space S.

(Processing Unit and Processing Unit Support Part)

As illustrated in FIGS. 2 and 3, the frame body 10 of the present embodiment includes two sets of processing units 30 disposed side by side in the X direction. Each processing unit 30 is supported by the pair of beams 13 extending in the X direction. That is, in the present embodiment, the pair of beams 13 extending in the X direction is equivalent to the processing unit support part.

Each processing unit 30 includes a pair of X-axis sliders 33, a Y-axis guide 34, a Y-axis slider 35, and a Z-axis guide 36. The pair of X-axis sliders 33 is supported so as to be movable along the X-axis rail 13A provided on each beam 13. Each of the pair of X-axis sliders 33 includes an X-axis drive motor (not illustrated) used as a drive source. The Y-axis guide 34 extending in the Y direction is straddled on each of the pair of X-axis sliders 33. By synchronously controlling the X-axis drive motors, the pair of X-axis sliders 33 is synchronously driven along the X-axis rail 13A, and thereby, the Y-axis guides 34 are moved. The Y-axis slider 35 is attached to each Y-axis guide 34 so as to be movable along the Y-axis guide 34 (Y direction). The Z-axis guide 36 extending in the Z direction is attached to the Y-axis slider 35. The Y-axis slider 35 includes a Y-axis drive motor (not illustrated) used as a drive source that moves the Y-axis slider 35. By driving the Y-axis drive motor, the Y-axis slider 35 is moved along the Y-axis guide 34, and thereby, the Z-axis guide 36 is moved. A plane moving mechanism that freely moves the processing tool 32 (to be described below) along a horizontal plane (XY plane) is constituted of the X-axis slider 33, the Y-axis guide 34, and the Y-axis slider 35.

The processing unit 30 further includes a Z-axis slider 37 and a rotating mechanism 38. The Z-axis slider 37 is attached to the Z-axis guide 36 so as to be movable along the Z-axis guide 36. The Z-axis slider 37 includes a Z-axis drive motor (not illustrated) used as a drive source that moves the Z-axis slider 37. The rotating mechanism 38 is provided at the end of the Z-axis slider 37 on the Z-direction lower side. The rotating mechanism 38 holds the processing tool 32 so as to be rotatable around a central axis (Z-axis) of the Z-axis slider 37 extending in the Z direction. A vertical plane moving mechanism that freely moves the processing tool 32 along a vertical plane (YZ plane) is constituted of the Y-axis slider 35, the Z-axis guide 36, and the Z-axis slider 37.

The processing unit 30 further includes the processing tool 32 held by the rotating mechanism 38 of the processing unit 30. The processing tool 32 is held so as to be movable in the X direction, the Y direction, and the Z direction and rotatable in the Z-axis by the plane moving mechanism, the vertical plane moving mechanism, and the rotating mechanism 38. According to such a processing unit 30, predetermined process can be performed using the processing tool 32 on the workpiece W held by the positioning unit 20 to be described below.

A first processing tool 32A held by a first processing unit 30A provided on the supply unit 90 side out of the two sets of processing units 30 is, for example, a suction pad that holds the workpiece W with negative pressure. In the present embodiment, the second workpiece W2 placed on the supply unit 90 to be described below is held by the suction pad (first processing tool 32A), and then, is moved in the X direction, the Y direction, and the Z direction by the plane moving mechanism and the vertical plane moving mechanism of the first processing unit 30A. Accordingly, the second workpiece W2, which is conveyed by the transferring unit 40 and positioned on the first workpiece W1 positioned by the positioning unit 20, is positioned, and the second workpiece W2 is attached to the first workpiece.

A second processing tool 32B of a second processing unit 30B provided on the transferring unit 40 side out of the two sets of processing units 30 is, for example, a fastening tool (screw fastening tool) that fastens the first workpiece W1 and the second workpiece W2 with a screw. Specifically, after a hole formed in the second workpiece is aligned with a screw hole provided in the first workpiece, a screw supplied from a screw supply device (not illustrated) is supplied to the hole. Thereafter, a fastening tool (a driver bit mounted on a tip of the rotating mechanism 38) is lowered while being rotated and engaged with the fastening tool, and the fastening tool is lowered while being further rotated and screwed into the screw hole, so that fastening work is performed. A third workpiece, which becomes fastened article in which the first workpiece W1 and the second workpiece W2 are fastened to each other, can be manufactured by performing the fastening work with the second processing tool 32B.

(Transferring Unit and Transferring Unit Support Part)

As illustrated in FIGS. 2 and 3, the transferring unit support part 41 is a mount that is housed in the processing space S and placed on the horizontal surface of the base 11. The transferring unit 40 is constituted of a conveyor provided on the mount, and transfers a pallet P, on which the workpiece W (the first workpiece W1 or the third workpiece) is placed, in the Y direction (the transfer direction T of the workpiece W). The transferring unit 40 is housed in the processing space S so as to face second openings 53 (to be described below) in the Y direction.

(Positioning Unit and Positioning Unit Support Part)

Figure 4:
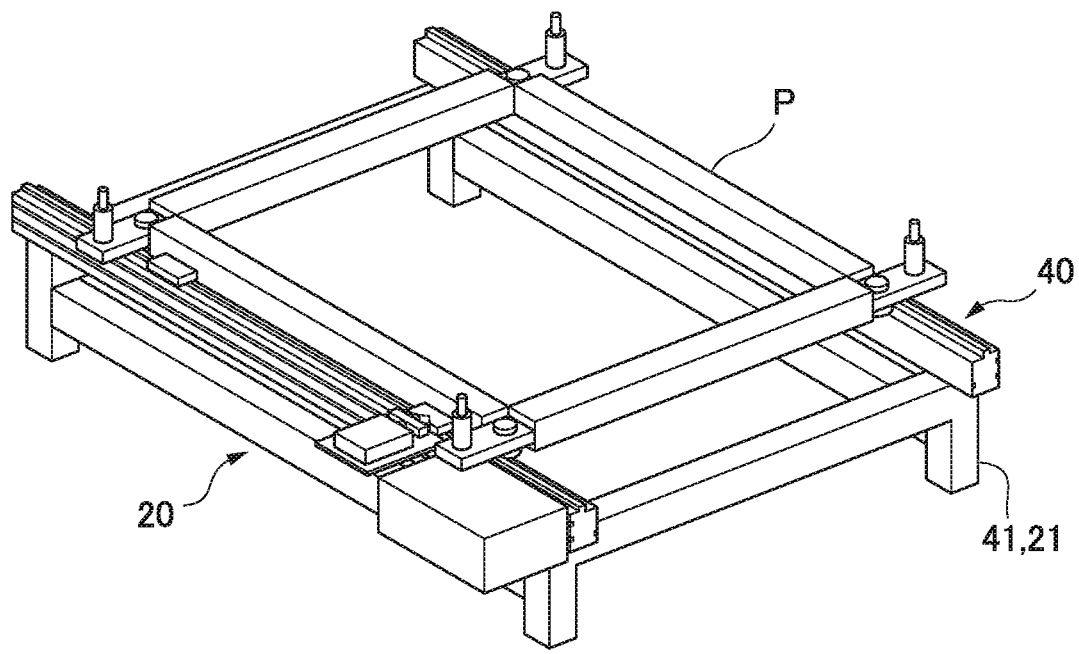
FIG. 4 is a view illustrating a positioning unit of the processing device of FIGS. 2 and 3.
Figure 5:
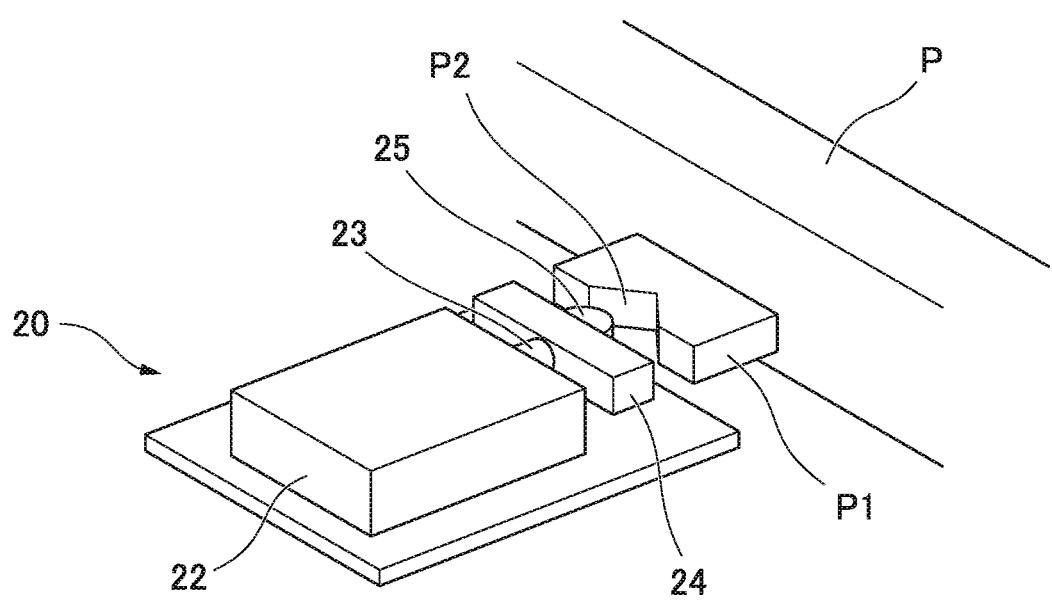
FIG. 5 is an enlarged view of main parts of the positioning unit of FIG. 4.

FIG. 4 is a view illustrating the positioning unit 20 of the processing device 1 of FIGS. 2 and 3, and FIG. 5 is an enlarged view of main parts of the positioning unit 20 of FIG. 4. As illustrated in FIGS. 4 and 5, the transferring unit support part 41 also serves as the positioning unit support part 21. The positioning unit 20 is attached to the positioning unit support part 21 on the X-direction outer side of the conveyor that is the transferring unit 40.

The positioning unit 20 includes a drive part 22, a forward/backward movable member 23, a movable body 24, and a positioning part 25. The drive part 22 is an actuator, for example, an air cylinder. The columnar forward/backward movable member 23 is attached to the end of the drive part 22 on the X-direction inner side such that the center thereof extends in the X direction. The drive part 22 moves the forward/backward movable member 23 in the X direction. The end of the forward/backward movable member 23 on the X-direction inner side is provided with the movable body 24 having a substantially rectangular parallelepiped shape. The semicircular prismatic positioning part 25 is provided on the surface of the movable body 24 facing the X-direction inner side such that a cylindrical surface thereof faces the X-direction inner side. As the positioning part 25 abuts a positioned part P1 formed on the pallet P transferred by the transferring unit 40, the pallet P is positioned.

In detail, the side surface of the pallet P facing the positioning unit 20 is provided with the positioned part P1 in which a V-shaped cutout P2 is formed. As the drive part 22 drives the forward/backward movable member 23 toward the X-direction inner side, the movable body 24 and the positioning part 25 move toward the X-direction inner side, and the cylindrical surface of the positioning part 25 abuts the V-shaped cutout P2 of the positioned part P1. Accordingly, the pallet P transferred by the transferring unit 40 is positioned. Since the position of the first workpiece W1 placed on the pallet P is defined by a plurality of pins formed on an upper surface of the pallet P, the first workpiece W1 is also positioned as the pallet P is positioned by the positioning unit 20.

(Supply Unit)

The supply unit 90 is disposed next to the transferring unit support part 41 in the X direction. The supply unit 90 is a mount that is housed in the processing space S and placed on the horizontal surface of the base 11. The second workpiece W2 is placed on the pallet P placed on the mount. The pallet P is supplied by a transfer device or an operator (not illustrated) via, for example, third openings 54 from the outside of the processing space S.

(Partition Member)

As illustrated in FIG. 2, the partition member 50 is constituted of a plurality of panel bodies 55A to 55D. The respective panel bodies are mounted on the frame body 10, and thereby, wall surfaces for partitioning the processing space S from the external space are formed. Here, the term "partitioning" the processing space S and the external space from each other by the partition member 50 means that the processing space S is specified by the respective wall surfaces constituting the partition member 50, extending surfaces of the respective wall surfaces, and imaginary planes connecting edges of the wall surfaces that face each other.

First, two wall surfaces (hereinafter referred to as XZ wall surfaces) extending in the X direction and the Z direction in the partition member 50 will be described. The two XZ wall surfaces have the same configuration. Two panel bodies located at both ends of each XZ wall surface in the X direction are uniform panel bodies 55A that are respectively provided with the uniform mounting sections 51 on which the opening/closing member 60 and the instrument attachment member 70 are mutually selectively mounted. In the present embodiment, the uniform panel bodies 55A are formed so that outer dimensions of them are the same as each other. Note that, in the present embodiment, the outer dimensions means that at least outer dimensions of the shares panel bodies on a plane for partitioning the processing space S and the external space are the same. Additionally, the uniform mounting sections 51 provided on the uniform panels have the same shape and size. The uniform panel bodies 55A are mounted on the base 11, the columns 12, and the beams 13.

In two XZ wall surfaces of the partition member 50, panel bodies are not provided on both sides of the transferring unit 40 in the Y direction, and the second openings 53 for allowing communication between the processing space S and the external space are formed. As described above, the transferring unit 40 is housed in the processing space S so as to face the second openings 53. Also, the first workpiece W1 is transferred from the inside of the processing space S to the external space or from the external space to the processing space S through the second openings 53.

Additionally, panel bodies are not provided on both sides of the supply unit 90 in the Y direction, either, and the third openings 54 for allowing communication between the processing space S and the external space is formed. The second workpiece W2 is supplied and replenished to the supply unit 90 through the third openings 54.

Additionally, in the present embodiment, each XZ wall surface is constituted of three types of rectangular panel bodies including a uniform panel body 55A, a first panel body 55B, and a second panel body 55C. The lengths of long sides and short sides of a surface that forms an XZ wall surface of the first panel body 55B, are the same as those of the uniform panel body 55A.

First panel bodies 55B are disposed so as to surround a second opening 53 and a third opening 54. In detail, two first panel bodies 55B are mounted on a beam 13 on the Z-direction upper sides of the second opening 53 and the third opening 54 such that long sides thereof become parallel to each other in the X direction and are adjacent to each other in the Z direction. Two first panel bodies 55B are mounted on the base 11, a column 12, and a beam 13 between the second opening 53 and the third opening 54 such that long sides thereof extend in the Z direction and are adjacent to each other the X direction. One first panel body 55B is mounted on the base 11, a column 12, and a beam 13 between the second opening 53 and a uniform panel body 55A or between the third opening 54 and a uniform panel body 55A such that long sides thereof extend in the Z direction.

The second panel body 55C has long sides having a length twice the length of the short sides of the first panel body 55B, and short sides having a length equal to that of short sides of the first panel body 55B. The second panel body 55C is disposed such that the long sides thereof become parallel to each other in the X direction. The second panel body 55C is disposed at upper parts (Z-direction upper sides) of the two juxtaposed first panel bodies 55B or upper parts of the juxtaposed uniform panel body 55A and first panel body 55B. The second panel body 55C is mounted on the beam 13. The short sides of the second panel body 55C are connected such that short sides and short sides of the first panel body 55B disposed on the Z-direction upper side of the second opening 53 or the third opening 54 coincide with each other.

Second, two wall surfaces (hereinafter referred to as YZ wall surfaces) extending in the Y direction and the Z direction in the partition member 50 will be described. Each YZ wall surface connects one ends of the two XZ wall surfaces. Additionally, the two YZ wall surfaces are orthogonal to the XZ wall surfaces. One YZ wall surface (a left side of FIG. 2) is constituted of one panel body (a third panel body 55D). The length of long sides of the third panel body 55D is equal to a distance between the two XZ wall surfaces, and the length of short sides thereof is equal to that of the short sides of the second panel body 55C. The third panel body 55D is disposed such that the long sides thereof extend in the Y direction, and the short sides thereof are connected such that short sides and both ends of the second panel body 55C located at one ends of the two XZ wall surfaces in the X direction coincide with each other. The third panel body 55D is mounted on the beams 13. On the Z-direction lower side of the third panel body 55D, the processing space S is partitioned from the external space by the control device 80 to be described below.

The other YZ wall surface (a right side of FIG. 2) is constituted of one or a plurality of panel bodies. In the illustrated example, the third panel body 55D is disposed at an upper part in the Z direction. However, as panel bodies that constitute this YZ wall surface, panel bodies having the same shape as any of the above-described first to third panel bodies 55B to 55D may be used, or panel bodies having a shape different from these may be used. Additionally, these panel bodies may be mounted on any of the base 11, the columns 12 and the beams 13.

In the present embodiment, the uniform panel bodies 55A including the uniform mounting sections 51 are disposed apart from each other in the X direction in each XZ wall surface. Accordingly, the plurality of uniform mounting sections 51 include a first uniform mounting section disposed on one side in a direction (X direction) Intersecting the transfer direction T (Y direction) of the workpiece W with the transferring unit 40 interposed therebetween, and a second uniform mounting section disposed on the other side. Additionally, since the two XZ wall surfaces have the same configuration, the plurality of uniform mounting sections 51 include a third uniform mounting section disposed on one side in the transfer direction T (Y direction) of the workpiece W with the transferring unit 40 interposed therebetween, and a fourth uniform mounting section disposed on the other side.

The opening/closing member 60, which is mutually selectively mounted on a uniform mounting section 51, is capable of opening/closing the first opening 52 formed in the partition member 50. In the present embodiment, an opening, which is the uniform mounting section 51 provided in a uniform panel body 55A, is equivalent to the first opening 52. The first opening 52 allows communication between the processing space S and the external space. The operator enters and exits the processing space S through the first opening 52. Although a door is used in the illustrated example, a shutter or the like may be used as the opening/closing member 60.

The control instrument 71 (for example, the control instrument that controls the input instrument and the output instrument that are included in the positioning unit 20 and the processing unit 30), which controls the input instrument and the output instrument (not illustrated) that are used with the processing device 1, is attached to the instrument attachment member 70 that is mutually selectively mounted on a uniform mounting section 51. The control instrument 71 includes a control instrument that amplifies an input signal of a sensor or diagnoses an operating state, an electromagnetic valve that switches the pressure operation to a pressure cylinder, or the like. The operator controls operating instruments, such as the positioning unit 20 and the processing unit 30, which are included in the processing device 1, by operating the control instrument 71 outside the processing space S.

In consideration of the surrounding environments, whether either the opening/closing member 60 or the instrument attachment member 70 is to be attached to each of the uniform mounting sections 51 of the four uniform panel bodies 55A provided in the partition member 50 can be selected. Also, whether neither the opening/closing member 60 nor the instrument attachment member 70 is to be attached to them can be selected. Here, the surrounding environments are struggling with obstacles and structures around the installation positions of the processing devices 1, a operator's position, a passage for the operator, the transfer path of the workpiece W, and the like. In the present embodiment, the instrument attachment member 70 is mounted on a uniform mounting section 51 near the control device 80 to be described below, and the door as the opening/closing member 60 is mounted on a uniform mounting section 51 separated from the control device 80.

(Control Device and Control Device Support Part)

The control device 80 is placed on the base 11 in the external space. The control device 80 is adjacent to the partition member 50 or the processing space S so as to partition the processing space S from the external space. The control device 80 performs superior-order control of all the instruments, such as the positioning unit 20, the processing unit 30, and the transferring unit 40, which are included in the processing device 1. In the present embodiment, the control device 80 is a housing that houses a switch, a distributor, and a breaker that control the electrical power supplied to the instruments included in the processing device 1, a controller including an operating program of the processing device 1, and the like.

(Working Effects by Processing Device of Present Embodiment)

Since the processing device 1 of the present embodiment as described above includes the partition member 50 that partitions the processing space S from the external space, it is not necessary to newly provide a safe fence surrounding the processing device 1. Also, the partition member 50 has the plurality of uniform mounting sections 51 on which the opening/closing member 60 and the instrument attachment member 70 are mutually selectively mounted. For that reason, the arrangement of the opening/closing member 60 and the instrument attachment member 70 can be selectively determined in consideration of the arrangement of existing objects in an installation location of the processing device 1. Hence, according to the processing device 1 of the present embodiment, it is not necessary to markedly make changes for preventing any unexpected interference with the existing objects as in related-art processing devices. As a result, the plurality of processing devices 1 including the partition member 50 equivalent to the safe fence can be manufactured in a place that production work is easy. As a result, costs required for installation of the processing devices 1 into a factory can be reduced, and the installation time of the processing devices 1 can be prevented from being prolonged.

Additionally, the uniform mounting sections 51 including the opening/closing member 60 and the instrument attachment member 70 can be selected in consideration of various conditions, such as the shapes of the installation location of each processing devices 1, and the distance from the processing device 1 to an obstacle or an interference object, such as a column, a walls, or a passage. For that reason, the movement lines (movement distances) of the operator inside and outside the processing space S can be shortened, or the operation of the respective units, the control device 80, and the control instrument 71 can be easily performed.

Additionally, since the plurality of uniform mounting sections 51 have the same shape and size as each other, the uniform mounting sections 51 can be easily provided.

Additionally, the frame body 10 is provided with the positioning unit support part 21 that supports the positioning unit 20 in the processing space 5, the processing unit support part 31 that supports the processing unit 30 in the processing space S, and the partition member mounting section on which the partition member 50 is mounted. For that reason, the frame body 10, the positioning unit support part 21, and the processing unit support part 31 can be unitized. As a result, installation of the processing device 1 becomes easy.

Additionally, the frame body 10 includes the base 11, the plurality of columns 12 supported by the base 11, and the plurality of beams 13 supported by the columns 12. The processing space S can be effectively utilized up to an upper space thereof by providing such a frame body 10 with the positioning unit support part 21, the processing unit support part 31, and the partition member mounting section.

Moreover, the base 11 is provided with the positioning unit support part 21, and the beams 13 are provided with the plane moving mechanism that moves the processing tool 32 in the plane. Accordingly, the processing tool 32 can be moved to a work position above the positioning unit support part 21. As a result, the processing tool 32 can be moved without interfering with the positioned workpiece W.

Additionally, the processing device 1 of the present embodiment includes the control device 80 that performs superior-order control of all the instruments included in the processing device 1, and the frame body 10 includes the control device support part that supports the control device 80 in the external space. Since the control device 80 is supported by the frame body 10, the control device 80 can be unitized with the constituent members of the processing device 1. For that reason, in a case where an installation factory where the processing device 1 is installed is different from a manufacturing factory where the processing device 1 is manufactured, the work of separating electric wires between the control instrument 71 and the control device 80 included in the processing device 1, which occurs when the processing device 1 is transferred from the manufacturing factory to the installation factory, is unnecessary. Additionally, in the installation factory, installation of the control device 80 or re-connection of electric wires between instruments included in the processing device 1 and the control device 80 is unnecessary at the time of installation of the processing device 1. Additionally, in the present embodiment, the control device 80 also serves as a portion of the partition member 50, and the processing space S is partitioned from the external space by the partition member 50 and the control device 80. For that reason, the number of panel bodies that constitute the partition part can be reduced. Accordingly, manufacturing of the processing device 1 becomes still easier.

Additionally, the processing device 1 of the present embodiment includes the transferring unit 40 that enables the transfer of the workpiece W between the processing space S and the external space. The partition member 50 has the second opening 53, and the transferring unit 40 is housed in the processing space S so as to face the second opening 53. Also, the frame body 10 includes the transferring unit support part 41 that supports the transferring unit 40 in the processing space S. For that reason, the processing device 1 is applicable to the processing system 100 that continuously performs a plurality of kinds of work on the workpiece W. In detail, the transfer path of the workpiece W can be formed by disposing a plurality of such processing devices 1 and connecting the transferring units 40 of the processing devices 1 to each other directly or via the transfer device 2. The processing system 100 that continuously performs the plurality of kinds of work on the workpiece W transferred along the transfer path can be formed.

Additionally, the partition member 50 is constituted of the plurality of panel bodies 55A to 55D, the plurality of panel bodies include a plurality of uniform panel bodies 55A provided with the uniform mounting sections 51, and the opening/closing member 60 and the instrument attachment member 70 are mutually selectively mounted on the uniform mounting sections 51 of the uniform panel bodies 55A. Since the partition member 50 is constituted of the plurality of panel bodies, the partition member 50 can be easily mounted on the frame body 10. Since the plurality of panel bodies include the plurality of uniform panel bodies 55A provided with the uniform mounting sections 51, the partition member 50 can be easily provided with the uniform mounting sections 51.

Additionally, since the plurality of uniform panel bodies 55A are formed so that outer dimensions of them are the same as each other, any of the uniform panel bodies 55A can be easily mounted on the frame body 10. Moreover, in the present embodiment, the partition member 50 is constituted of a plurality of types of panel bodies 55A to 55D. For that reason, if the same type of panel bodies (panel bodies having the same outer shape) are used, the mounting positions of the panel bodies are not limited. Thus, the panel bodies can be still more easily mounted on the frame body 10. Since the outer dimensions of the uniform panel bodies 55A provided with the uniform mounting sections 51 are the same as those of the first panel bodies 55B, it is also possible to exchange the mounting positions of the uniform panel bodies 55A with the mounting positions of the first panel bodies 55B. As a result, as compared to a case where the outer dimensions of the uniform panel bodies 55A are different from those of the other panel bodies, the degrees of freedom of arrangement of the opening/closing member 60 and the instrument attachment member 70 can be increased.

Additionally, the processing unit 30 has the plane moving mechanism that moves the processing tool 32 in the plane, and the plane moving mechanism is supported by the beams 13 of the frame body 10. For that reason, it is possible to easily change the movement range of the processing tool 32 by the plane moving mechanism in accordance with extension or shortening of the beams 13, and an optimal processing space S where the processing tool 32 can be moved toward the transferring unit 40, the supply unit 90, and the workpiece W placed on these can be set.

Additionally, the plurality of uniform mounting sections 51 include the first uniform mounting section disposed on one side in the direction intersecting the transfer direction T (X direction) of the workpiece W with the transferring unit 40 interposed therebetween, and the second uniform mounting section disposed on the other side. Since the two uniform mounting sections 51 are disposed apart from each other in the direction (X direction) intersecting the transfer direction T of the workpiece W, the opening/closing member 60 and the instrument attachment member 70 can be mounted on the same wall surfaces (XZ wall surfaces) of the partition member 50.

Additionally, the plurality of uniform mounting sections 51 include the third uniform mounting section disposed on one side in the transfer direction T of the workpiece W with the transferring unit 40 interposed therebetween, and the fourth uniform mounting section disposed on the other side. Since the two uniform mounting sections 51 are disposed apart from each other in the transfer direction T (Y direction) of the workpiece W, the opening/closing member 60 and the instrument attachment member 70 can be mounted on the same side with respect to the transferring unit 40 in the X direction. Accordingly, even in a case where the transferring unit 40 is connected to the external transfer device 2, the movement of the operator between the opening/closing member 60 and the instrument attachment member 70 is not hindered by the transfer path of the workpiece W.

(Modification Example of Processing Device)

The processing device of the invention is not limited to the above embodiment.

For example, the uniform mounting sections are not limited to those provided at the uniform panel bodies, and a plurality of openings serving as the uniform mounting sections may be provided between the panel bodies that constitute the frame body. The opening/closing member or the instrument attachment member may be directly mounted on the openings serving as the uniform mounting sections. The outer dimensions of the opening/closing member and instrument attachment member do not have to be the same as each other, and the shapes or sizes of the opening/closing member and instrument attachment member are not particularly limited if these members are mounted on the uniform mounting sections. Additionally, at least two uniform mounting sections may be provided. Additionally, the partition member may be provided with at least one opening/closing member and at least one instrument attachment member and may be provided with a plurality of the opening/closing members and/or a plurality of instrument attachment members.

It is preferable that the partition member is formed of a plurality of panel bodies having the same outer dimensions (the lengths of the long sides and the short sides). Accordingly, since the mounting positions of the panel bodies are not limited, the mounting of the panel bodies onto the frame body becomes still easier. In a case where the plurality of panel bodies include the uniform panel bodies provided with the uniform mounting sections, the outer dimensions of the uniform panel bodies are the same as those of the other panel bodies. For that reason, the degree of freedom of the mounting positions of the uniform panel bodies are improved, and the degree of freedom of arrangement of the opening/closing member and the instrument attachment member are further improved. In a case where the plurality of panel bodies do not include the uniform panel bodies and the opening/closing member and the instrument attachment member are directly mounted on the plurality of panel bodies, it is preferable to make the outer dimensions of the opening/closing member and instrument attachment member the same as those of the plurality of panel bodies. Accordingly, the same effects as those in a case where the outer dimensions of the plurality of panel bodies including the uniform panel bodies are the same is obtained.

In addition, the partition member is not limited to being constituted of the plurality of panel bodies, and may be a fence or the like that partitions the processing space and the external space from each other and includes the plurality of uniform mounting sections as long as the partition member is mounted on (supported by) the frame body. Additionally, the plurality of panel bodies that constitute the partition member are not limited to flat plates, and panel bodies constituted of rectangular frames and wire nets stretched in the rectangular frames.

Additionally, the control device may serve as a portion of partition member as in the above embodiment. In detail, portions of the wall surfaces formed by the partition member or one of the wall surfaces formed by the partition member may be constituted of one side surface of a housing that constitutes the control device. In other words, the processing space may be surrounded by the partition member and the control device.

Moreover, the frame body may be constituted of only the base. In this case, the partition member may be self-supported on the installation surface of the base. In this case, the base is equivalent to the partition member mounting section. Additionally, in a case where the partition member is self-supported, a pillar-shaped supporting member provided perpendicularly on the installation surface of the base may be provided form a portion of the frame body, or the partition member may be mounted on the surface of the pillar-shaped supporting member that extends in the Z direction.

The base of the frame body has the horizontal surface (installation surface), and the installation surface may be provided only in a required portion after the overall base is integrally formed. For example, flat plate members including horizontal installation surfaces only in the respective locations of the base where the transferring unit support part, the control device, and the like are placed may be provided, and the respective flat plate members may be coupled to each other such that the overall base is united. Specifically, the flat plate members may be disposed if necessary on an upper surface of a coupling body formed by coupling H-beams or hollow prisms in a lattice to each other, and these may be united to form the base. Also, flat plate surfaces of the flat plate members or side surfaces (upper surfaces) of the H-beams or the prisms are used as installation surfaces, and the columns and the respective units of the frame body are disposed on these installation surfaces to provide respective support parts. Accordingly, the weight of the base can be achieved while securing strength as compared to a case where the base is formed by one flat plate.

The configurations of the positioning unit support part and the processing unit support part are not limited to those of the above embodiment, either. The positioning unit support part may be provided at the columns of the frame body, or the processing unit support part may be provided at the columns or the base. In addition, the term "providing" the frame body at the positioning unit support part or the processing unit support part means that the frame body includes these and these are attached to the frame body.

That is, the base or the columns themselves of the frame body may be used as the positioning unit support part, or the beams, the columns, or the base itself may be used as the processing unit support part. For example, the installation surfaces of the base in which the positioning unit and the processing unit are installed may be respectively used as the positioning unit support part and the processing unit support part. The positioning unit support part may be attached to the base or the columns of the frame body, or the processing unit support part may be attached to the beams, the columns, or the base.

The configuration of the processing unit is not limited to the above embodiment, and can be appropriately selected in accordance with the contents of work performed by the processing device. For example, a vertical multi-joint robot may be used as the processing unit, and the base (specifically, a portion of the base on which the vertical multi-joint robot is installed) may be used as the processing unit support part. In this case, the vertical multi-joint robot is disposed on the installation surface of the base. By using the vertical multi-joint robot, predetermined process can be performed in various postures. As other examples, the processing unit may be constituted of the vertical multi-joint robot and the same plane moving mechanism as that of the above embodiment, and a pair of beams including X-axis rails and extending in the X direction may be used as the processing unit support part. In this case, by attaching the vertical multi-joint robot to the Y-axis slider, the vertical multi-joint robot can be freely moved along the horizontal plane (XY plane), and predetermined process can be performed in various postures. Moreover, as another example, an X-axis rail may be attached to one of the beams extending in the X direction and used as the processing unit support part, and the processing unit may be constituted of the vertical multi-joint robot and one X-axis slider. In this case, the vertical multi-joint robot can be moved in the X direction. Additionally, in this example, the vertical multi-joint robot may be attached to each X-axis slider by providing two processing units, that is, by attaching two X-axis sliders to one X-axis rail. In addition, at least one processing unit may be provided, and three or more processing unites may be provided in accordance with the contents of work performed by the processing device.

The positioning unit may hold the workpiece at a predetermined position in the processing space, or may directly hold the workpiece transferred by the transferring unit.

The transferring unit may be disposed so as to face the second opening in the processing space, and one end or both ends of the transferring unit may protrude out of the processing space through the second opening. Additionally, in this case, the transferring unit support part may support the transferring unit in the processing space, or may support outside the processing space or on both sides of the inside of the processing space and the outside of the processing space. In a case where the transferring unit is supported outside the processing space, the transferring unit support part may be provided outside the processing space. Moreover, the transferring unit may be disposed on the installation surface of the base of the frame body, and this installation surface may be used as the transferring unit support part. Additionally, the transferring unit may be supported by the beams or the columns of the frame body, and the beams or the columns themselves may be used as the transferring unit support part.

The uniform sections may not be provided in accordance with the work performed in the processing device. In this case, the third opening can also be omitted. Additionally, the uniform sections may have a configuration in which the workpiece is transferred between the processing space and the external space, similarly to the transferring unit.

(Processing System)

In the processing system 100 of the present embodiment, as illustrated in FIG. 1, five processing devices 1 including the above-described configuration are installed along the transfer path formed in the transfer direction T of the workpiece W. A transfer device 2 is provided between the processing devices 1 spaced apart from each other in the transfer direction T. In detail, the transfer device 2 includes a first transfer device that is disposed adjacent to each of the plurality of processing devices 1 and is connected to one side of the transferring unit 40 of the processing device 1, and a second transfer device connected to the other side of the transferring unit 40 of the processing device 1, and the transfer path of the workpiece W in the processing system 100 is formed by the first transfer device, the second transfer device, and the transferring unit 40 of the processing device 1. In the present embodiment, a linear transfer path is formed by the transferring units 40 of the respective processing devices 1, and a plurality of the transfer devices 2. In addition, in the illustrated example, a conveyor is used as each transfer device 2.

In the five processing devices 1 of FIG. 1, the arrangements of the respective components excluding the opening/closing member 60 and the instrument attachment member 70 are the same. However, since the work contents in the respective processing devices 1 are different from each other, the configurations of the processing units 30 are different from each other. The processing devices 1 are referred to as a first processing device 1A, a second processing device 1B, a third processing device 1C, a fourth processing device 1D, and a fifth processing device 1E sequentially from the upstream side (the left side of FIG. 1) in the transfer direction T of the workpiece W, and will be described below in detail.

(First Processing Device)

The first processing device 1A is located on the uppermost stream (the left side of FIG. 1) in the transfer direction T of the workpiece W. The first processing device 1A is installed adjacent to an L-shaped wall surface 3 in the factory. In the first processing device 1A, the arrangement of the control device 80 and the attachment positions of the opening/closing member 60 and the instrument attachment member 70 are adjusted such that the control device 80 is made operable (the operation of the control device 80 is not hindered by the wall surface 3). Specifically, three sides of the processing space S of the first processing device 1A are surrounded by the L-shaped wall surface 3 and the control device 80. For this reason, in the first processing device 1A, the control device 80 can be disposed only on the side where there is no wall surface 3 in a direction (an upward-downward direction in FIG. 1) orthogonal to the transfer direction T of the workpiece W. Additionally, in the first processing device 1A, two uniform mounting sections 51, which are not adjacent to the L-shaped wall surface 3, among the four uniform mounting sections 51, are available. The opening/closing member 60 and the instrument attachment member 70 are mutually selectively attached to these uniform mounting sections 51.

In the illustrated example, the instrument attachment member 70 to which the control instrument 71 is attached is mounted to a uniform mounting section 51 near the control device 80 out of the two available uniform mounting sections 51. For that reason, the movement distance between the control device 80 and the control instrument 71 when the operator operates the control device 80 and the control instrument 71 can be shortened. Additionally the opening/closing member 60 is attached to the remaining uniform mounting sections 51.

(Second Processing Device)

The second processing device 1B is installed apart from the first processing device 1A on the downstream side of the first processing device 1A. The transferring unit 40 of the second processing device 1B is connected to the transferring unit 40 of the first processing device 1A via the transfer device 2. There is no interference object or obstacle around the second processing device 1B. For that reason, in the second processing device 1B, the arrangement of the control device 80 can be set on both sides in the direction orthogonal to the transfer direction T of the workpiece W. Additionally, all the four uniform mounting sections 51 are available, and the opening/closing member 60 and the instrument attachment member 70 are mutually selectively attached to these four uniform mounting sections 51.

In the illustrated example, the opening/closing member 60 is mounted on a uniform mounting section 51 of the second processing device 1B that faces the opening/closing member 60 of the first processing device 1A. For that reason, the movement line of the operator between the opening/closing members 60 of the first and second processing devices 1A and 1B can be linearly secured. Additionally, the instrument attachment member 70 is mounted on a uniform mounting section 51 at a position that faces the opening/closing member 60 in the transfer direction T. That is, the opening/closing member 60 and the instrument attachment member 70 is mounted on the uniform mounting section 51 of the second processing device 1B on the same side as the opening/closing member 60 of the first processing device 1A with respect to the transferring unit 40 and the transfer device 2. Moreover, the control device 80 of the second processing device 1B is also provided on the same side as the opening/closing member 60 of the first processing device 1A. For that reason, the entry and exit of the first second processing devices 1A and 1B into and from the processing space S and the movement distance when the operator operates the control instrument 71 and the control device 80 of the second processing device 1B can be made to be the shortest.

In the second processing device 1B, the opening/closing member 60 is also mounted on a uniform mounting section 51 separated in the direction orthogonal to the transfer direction T of the workpiece W from a uniform mounting section on which an instrument mounting member is mounted. By mounting the opening/closing member 60 on both sides of the transferring unit 40, it is easy to deal with the trouble caused in the processing space S and perform periodical maintenance.

(Third Processing Device)

The third processing device 1C is installed apart from the second processing device 1B on the downstream side of the second processing device 1B. The transferring unit 40 of the third processing device 1C is connected to the transferring unit 40 of the second processing device 1B via the transfer device 2. The third processing device 1C is installed adjacent to a column 4 in the factory. In the third processing device 1C, three uniform mounting sections 51, which are not adjacent to the column 4 in the factory, among the four uniform mounting sections 51, are available. The opening/closing member 60 and the instrument attachment member 70 are mutually selectively attached to these uniform mounting sections 51.

In the illustrated example, in the third processing device 1C, the column 4 is present adjacent to a uniform mounting section 51 at a position that faces the instrument attachment member 70 of the second processing device 1B. For this reason, the opening/closing member 60 is mounted on a uniform mounting section 51 at a position, which faces the uniform mounting section 51 adjacent to the column 4, among the four uniform mounting sections 51 in the third processing device 1C. For that reason, the movement distance of the operator between the opening/closing members 60 of the second and third processing device 1B and 1C can be made to be the shortest. A uniform mounting section 51, which the instrument attachment member 70 is mounted, among the remaining uniform mounting sections 51, is located on a side opposite to the opening/closing member 60 with respect to the transferring unit 40 and the transfer device 2. For that reason, the control device 80 is disposed on the side opposite to the opening/closing member 60 with the transfer device 2 interposed therebetween. Accordingly, the movement distance of the operator when the control device 80 and the control instrument 71 can be shortened. Additionally, the uniform mounting section 51 on which the instrument attachment member 70 is mounted is at a position that faces the instrument attachment member 70 of the fourth processing device 1D (to be described below) located on the downstream side of the third processing device 1C. Accordingly, the movement distance of the operator between the control instruments 71 of the third and fourth processing devices 1C and 1D can be made to be the shortest.

(Fourth and Fifth Processing Devices)

The fourth processing device 1D is installed apart from the third processing device 1C on the downstream side of the third processing device 1C. The transferring unit 40 of the fourth processing device 1D is connected to the transferring unit 40 of the third processing device 1C via the transfer device 2. Additionally, the fifth processing device 1E is installed adjacent to the fourth processing device 1D on the downstream side of the fourth processing device 1D. The transferring unit 40 of the fifth processing device 1E is directly connected to the transferring unit 40 of the fourth processing device 1D on the upstream side thereof, and is connected to the transfer device 2 on the downstream side thereof. For that reason, in each of the fourth and fifth processing device 1D and 1E, only two uniform mounting sections 51 on a side, which is not adjacent to the fourth processing device 10 or the fifth processing device 1E, among the four uniform mounting sections 51, are available, and the opening/closing member 60 and the instrument attachment member 70 are mutually selectively attached to these two uniform mounting sections 51.

In the illustrated example, the opening/closing member 60 is mounted on a uniform mounting section 51 of the fourth processing device 1D that faces the opening/closing member 60 of the third processing device 1C. For this reason, the movement distance of the operator between the opening/closing members 60 of the third and fourth processing devices 1C and 1D can be made to be the shortest. Additionally, the opening/closing member 60 is mounted on a uniform mounting section 51 of the fifth processing device 1E on the same side as the opening/closing member 60 of the fourth processing device 1D with respect to the transferring unit 40 and the transfer device 2. For this reason, the movement distance of the operator between the opening/closing members 60 of the third and fifth processing devices 1C to 1E can be made to be the shortest.

In the fourth or fifth processing device 1D or 1E, the instrument attachment member 70 to which the control instrument 71 is attached is mounted on the remaining uniform mounting section 51. Since the instrument attachment member 70 of the fourth or fifth processing device 1D or 1E is mounted on the uniform mounting section 51 on the same side with respect to the transferring unit 40 and the transfer device 2, the movement distance of the operator between the control instrument 71 of the fourth or fifth processing device 1D or 1E can be made to be the shortest. Additionally, the control device 80 of the fourth or fifth processing device 1D or 1E is disposed on the same side as the instrument attachment member 70 with respect to the transferring unit 40 and the transfer device 2. For that reason, the movement distance of the operator between the control device 80 and the control instrument 71 of the fourth or fifth processing device 1D or 1E can be the shortest. Moreover, the instrument attachment member 70 of the fourth processing device 1D faces the instrument attachment member 70 of the third processing device 1C. That is, the instrument attachment member 70 and the control device 80 of the fourth or fifth processing device 1D or 1E are disposed on the same side as the instrument attachment member 70 and the control device 80 of the third processing device 1C with respect to the transferring unit 40 and the transfer device 2. For that reason, the movement distance of the operator between the control device 80 and the control instrument 71 of the third or fifth processing device 1C to 1E can be made to be the shortest.

(Effects by Processing System of the Present Embodiment)

According to the processing system 100 of the above present embodiment, a plurality of the above-described processing devices 1 are provided. Thus, the plurality of processing devices 1 can be efficiently manufactured with common components, and the configuration of the partition member 50 of each processing device 1 manufactured in advance can be easily changed in accordance with surrounding environments. For that reason, the processing system 100 constituted of the plurality of processing devices 1 can be efficiently formed in accordance with the surrounding environments.

In detail, the partition member 50, which requires a change in accordance with the surrounding environments among the components of each processing device 1, has the plurality of uniform mounting sections 51 on which the opening/closing member 60 and the instrument attachment member 70 are mutually selectively mounted. For that reason, the opening/closing member 60 and the instrument attachment member 70 can be disposed at different positions in each processing device 1. Hence, a uniform mounting section 51 on which the opening/closing member 60 and the instrument attachment member 70 are mounted can be selected in consideration of a relationship with the work performed by other processing devices 1, and the mounting positions of the opening/closing members 60 and the instrument attachment members 70 of the other processing devices 1, in addition to the surrounding environments of the installation location of each processing device 1. Accordingly, the movement distance of the operator between the plurality of processing devices 1 can be shortened, and the processing system 100 that facilitates the operation of the control device 80 and the control instrument 71 can be formed.

Additionally, the transfer device 2 includes the first transfer device that is disposed adjacent to each of the plurality of processing devices 1 and is connected to one side of the transferring unit 40 of the processing device 1, and the second transfer device connected to the other side of the transferring unit 40 of the processing device 1, and the transfer path of the workpiece W in the processing system 100 is formed by the first transfer device, the second transfer device, and the transferring unit 40 of the processing device 1. For that reason, since the installation of the processing device and the installation of the transfer device 2 can be individually performed, the processing system 100 can be efficiently formed as compared to a case where the transfer path of the processing system 100 is formed by a single device.

In addition, the configuration of the processing system is not limited to the above embodiment. For example, a plurality of the transfer paths may be provided, or the transfer path may be branched into a plurality of transfer paths and or be curved or folded. Additionally, the transferring unit of the processing device may be made to protrude from the second opening, and a transfer path outside the processing device may be formed by a transferring unit made to protrude from the adjacent processing device. Additionally, a portion of the transfer device may be used as the transfer path in the processing space, without providing the processing device with the transferring unit.

Additionally, a self-propelled transport device may be used as the transfer device. Additionally, in the processing system related to the above-described embodiment, in some of the plurality of transfer devices, the conveyor may not be provided as the transfer device, and the workpiece may be transported using the self-propelled transport device or the operator may transport the workpiece. Moreover, the above-described processing device can also be applied not only to the processing system of the above embodiment but also to a processing system which include the plurality of processing devices and in which the operator transports the workpiece between the plurality of processing devices.

INDUSTRIAL APPLICABILITY

According to the processing device and the processing system of the invention, the configuration of each processing device can be easily changed in accordance with surrounding environments, the processing system can be efficiently formed.

REFERENCE SIGNS LIST

100: PROCESSING SYSTEM
1: PROCESSING DEVICE
2: TRANSFER DEVICE
10: FRAME BODY
20: POSITIONING UNIT
30: PROCESSING UNIT
40: TRANSFERRING UNIT
50: PARTITION MEMBER
51: UNIFORM MOUNTING SECTION
60: OPENING/CLOSING MEMBER
70: INSTRUMENT ATTACHMENT MEMBER
S: PROCESSING SPACE
W: WORKPIECE

The invention claimed is:

1. A processing device comprising:
a partitioner partitioning a processing space and an external space outside the processing space from each other;
a frame body on which the partitioner is mounted;
a positioner supported by the frame body and configured to hold a workpiece at a predetermined position in the processing space;
a processor supported by the frame body and configured to apply a predetermined process using a processing tool on the workpiece held by the positioner;
an opening/closing member that is a door or a shutter installed on the partitioner and configured to open/close a first opening formed in the partitioner; and
an instrument attacher installed on the partitioner and to which a control instrument for controlling the positioner and the processor is attached,
wherein the partitioner has a plurality of mounting sections on which the opening/closing member and the instrument attacher are selectively mounted,
wherein each of the plurality of mounting sections is the first opening,
wherein the partitioner is constituted of a plurality of panel bodies,
wherein the plurality of panel bodies includes a plurality of uniform panel bodies provided with the plurality of mounting sections,
wherein the opening/closing member and the instrument attacher are configured to be selectively mounted on the plurality of mounting sections of the plurality of uniform panel bodies, and the plurality of mounting sections are disposed apart from each other, wherein the opening/closing member is mounted on a first mounting section of the mounting sections, the instrument attacher is mounted on a second mounting section of the mounting sections different from the first mounting section, the opening/closing member is configured to be attached to the second mounting section, and the instrument attacher configured to be attached to the first mounting section.

2. The processing device according to claim 1, wherein the plurality of mounting sections have the same shape and size as each other.

3. The processing device according to claim 1, further comprising:

a controller configured to perform superior-order control of all instruments included in the processing device, wherein the frame body includes a controller supporter supporting the controller in the external space.

4. The processing device according to claim 1, wherein the plurality of uniform panel bodies are formed so that outer dimensions of the uniform panel bodies are the same as each other.

5. The processing device according to claim 1, further comprising:

a first transferer configured to transfer the workpiece between the processing space and the external space, wherein the partitioner has a second opening, wherein the first transferer is housed in the processing space so as to face the second opening, and wherein the frame body is provided with a transferer supporter supporting the first transferer in the processing space in the frame body.

6. The processing device according to claim 5, wherein the plurality of mounting sections include a first mounting section disposed on one side in a transfer direction of the workpiece with the first transferer interposed therebetween, and a second mounting section disposed on the other side.

7. The processing device according to claim 1, further comprising:

a first transferer configured to transfer the workpiece between the processing space and the external space, wherein the partitioner has a second opening, wherein the first transferer disposed so as to face the second opening in the processing space, and wherein the frame body is provided with a transferer supporter supporting the first transferer.

8. The processing device according to claim 7, wherein the plurality of mounting sections include a first mounting section disposed on one side in a direction intersecting a transfer direction of the workpiece with the first transferer interposed therebetween, and a second mounting section disposed on the other side.

9. The processing device according to claim 7, wherein the plurality of mounting sections include a first mounting section disposed on one side in a transfer direction of the workpiece with the first transferer interposed therebetween, and a second mounting section disposed on the other side.

10. The processing device according to claim 1, wherein the frame body is provided with a positioner supporter supporting the positioner in the processing space, a processor supporter supporting the processor in the processing space, and a partitioner mounting section on which the partitioner is mounted.

11. The processing device according to claim 10, wherein the frame body includes a base, a plurality of columns supported by the base, and a beam supported by the columns, wherein the base or the columns are provided with the positioner supporter, and wherein the beam is provided with the processor supporter.

12. The processing device according to claim 10, wherein the frame body includes a base, a plurality of columns supported by the base, and a beam supported by the columns, wherein the base or the columns are provided with the positioner supporter, and wherein the base is provided with the processor supporter.

13. The processing device according to claim 10, wherein the frame body includes a base, a plurality of columns supported by the base, and a beam supported by the columns, wherein the base or the columns are provided with the positioner supporter, and wherein the columns are provided with the processor supporter.

14. The processing device according to claim 10, wherein the processor supporter has a plane mover configured to move the processing tool in a plane.

15. A processing system for transferring a workpiece between a plurality of processing devices and applying a predetermined process on the workpiece in each processing device, the processing system comprising:

a plurality of the processing devices according to claim 1; and a transfer device that is a conveyor or a self-propelled transporter transferring the workpiece between the plurality of processing devices.

16. The processing system according to claim 15, wherein the processing device further includes a transferer configured to transfer the workpiece between the processing space and the external space, wherein the transfer device is disposed adjacent to each of the plurality of processing devices, wherein the transfer device includes a first transfer device connected to one side of the transferer of the processing device, and a second transfer device connected to the other side of the transferer of the processing device, and wherein a transfer path of the workpiece in the processing system is formed by the first transfer device, the second transfer device, and the transferer of the processing device.

17. A processing device comprising:

a partitioner partitioning a processing space and an external space outside the processing space from each other;

a frame body on which the partitioner is mounted;

a processor supported by the frame body and configured to apply a predetermined process on the workpiece using a processing tool in the processing space;

an opening/closing member that is a door or a shutter installed on the partitioner and configured to open/close a first opening formed in the partitioner; and an instrument attacher installed on the partitioner and to which a control instrument for controlling the processor is attached, wherein the partitioner has a plurality of mounting sections on which the opening/closing member and the instrument attacher are selectively mounted, wherein each of the plurality of mounting sections is the first opening, wherein the partitioner is constituted of a plurality of panel bodies, wherein the plurality of panel bodies includes a plurality of uniform panel bodies provided with the plurality of mounting sections, and the plurality of mounting sections are disposed apart from each other, wherein the opening/closing member is mounted on a first mounting section of the mounting sections, the instrument attacher is mounted on a second mounting section of the mounting sections different from the first mounting section, the opening/closing member is configured to be attached to the second mounting section, and the instrument attacher configured to be attached to the first mounting section.

18. The processing device according to claim 17, further comprising:

a controller configured to perform superior-order control of all instruments included in the processing device, wherein the frame body includes a controller supporter supporting the controller in the external space.

19. A processing system for transferring a workpiece between a plurality of processing devices and applying a predetermined process on the workpiece in each processing device, the processing system comprising:

a plurality of the processing devices according to claim 17; and a transfer device that is a conveyor or a self-propelled transporter transferring the workpiece between the plurality of processing devices.

20. The processing system according to claim 19, wherein the processing device further comprises a transferer configured to transfer the workpiece between the processing space and the external space, wherein the transfer device is disposed adjacent to each of the plurality of processing devices, wherein the transfer device includes a first transfer device connected to one side of the transferer of the processing device, and a second transfer device connected to the other side of the transferer of the processing device, and wherein a transfer path of the workpiece in the processing system is formed by the first transfer device, the second transfer device, and the transferer of the processing device.

* * * * *